Dec. 9, 1969     G. ZEITRÄGER     3,482,657
DISK BRAKE WITH MECHANICAL ACTUATOR AND ADJUSTING MEANS
Filed May 21, 1968     2 Sheets-Sheet 2

G. Zeiträger
INVENTOR.

BY Karl F. Ross
Attorney

United States Patent Office 3,482,657
Patented Dec. 9, 1969

3,482,657
DISK BRAKE WITH MECHANICAL ACTUATOR AND ADJUSTING MEANS
Günther Zeiträger, Eddersheim (Main), Germany, assignor to Alfred Teves GmbH, Frankfurt am Main, Germany, a corporation of Germany
Filed May 21, 1968, Ser. No. 730,849
Int. Cl. F16d 55/224, 63/00, 65/46
U.S. Cl. 188—73       10 Claims

ABSTRACT OF THE DISCLOSURE

A wear-compensating hydraulic disk brake for automotive vehicles, mounted on a stationary yoke, has brakeshoes which can be wedged against opposite sides of a brake disk by a pair of pistons that are displaceable toward each other by hydraulic action or by a double-acting mechanical linkage and whose stroke can be adjusted from outside the brake housing.

---

My present invention relates to a hydraulically and mechanically operable disk brake for motor vehicles.

An important object of my invention is to provide means for translating unidirectional movement of a mechanical linkage into opposite motions of two brakeshoes mounted in a fixed yoke.

Another object is to provide improved wear-compensating means enabling readjustment of the brakeshoe stroke without disassembly of the mechanism.

According to a feature of my invention, two brakeshoes axially displaceable in a fixed yoke toward a centrally positioned disk are provided with respective actuating levers on opposite sides of a median plane containing the disk, these levers being linked to a pair of arms sharing a common pivot located within that plane; a driver-controlled operating element, such as a wire or cable, acts upon the junction of the two arms to rotate them jointly in the same or in opposite directions, with reference to a fixed yoke, against a restoring force which may be supplied by a biasing spring acting upon the operating element and/or individual springs bearing upon the brakeshoes.

In accordance with another feature of this invention, the two levers are coupled with their respective brakeshoe through shafts journaled in the yoke and provided with camming formations for the displacement of a pair of coaxial bolts, the latter acting upon the brakeshoes through nuts carried on their confronting forward extremities while their rear ends project through the yoke so as to be accessible to a srewdriver or other resetting tool for manual readjustment of the brakeshoe stroke, e.g. during and after relining. The nuts, normally held against rotation relative to their bolts by ratchet-type detent formations, are spring-loaded in a manner known per se to turn in a wear-compensating sense wherever the gap between the brake disk and the withdrawn brakeshoes becomes too large, i.e. when the nuts are spaced from the brakeshoes by more than a predetermined maximum distance.

The above and other features of my invention will be described in detail hereinafter with reference to the accompanying drawing in which:

FIG. 3 is a top plan view of a similar brake assembly with a modified linkage embodying my invention.

Figure 1:
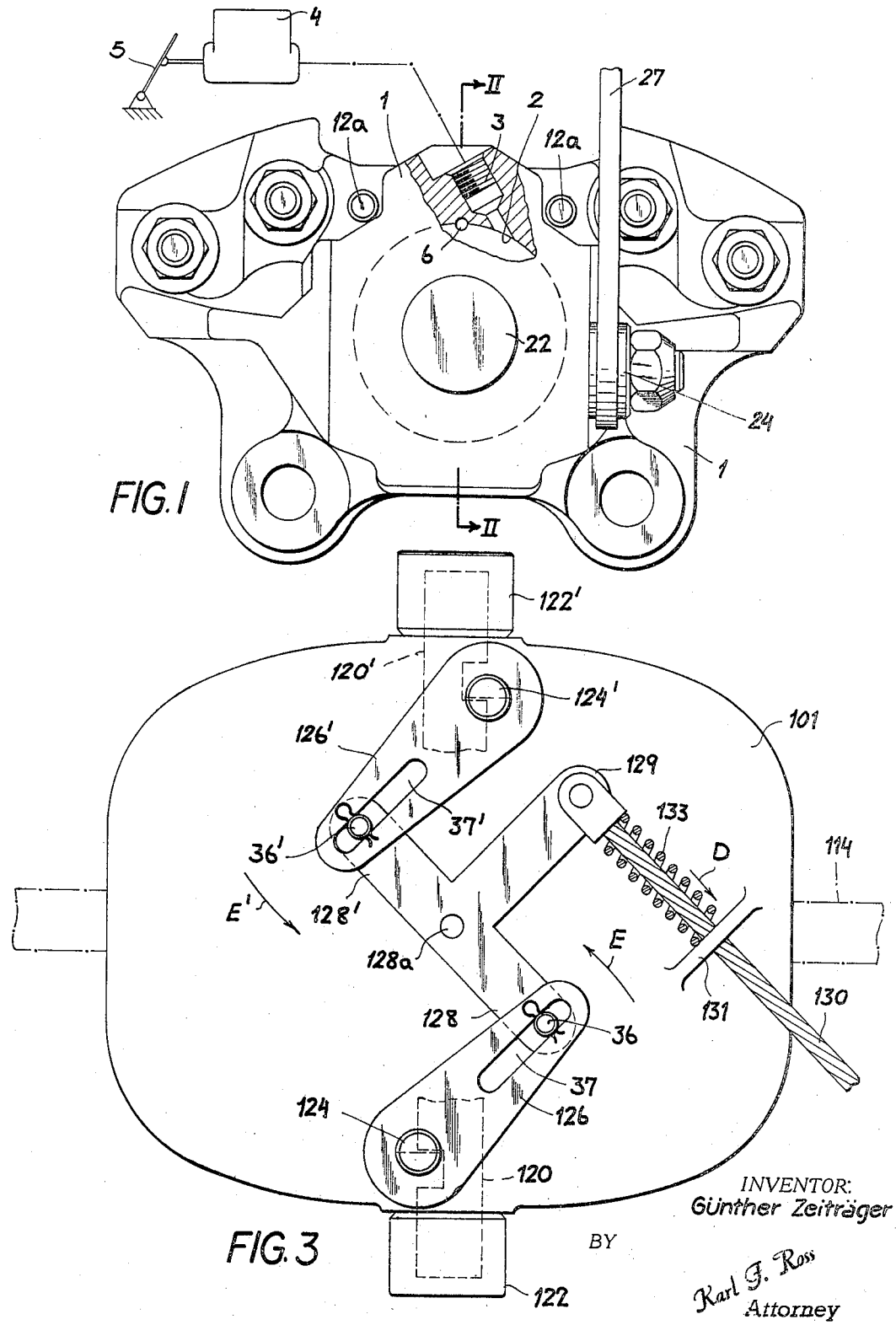
FIG. 1 is a side view, partly in section, a vehicular brake assembly according to my invention.
Figure 2:
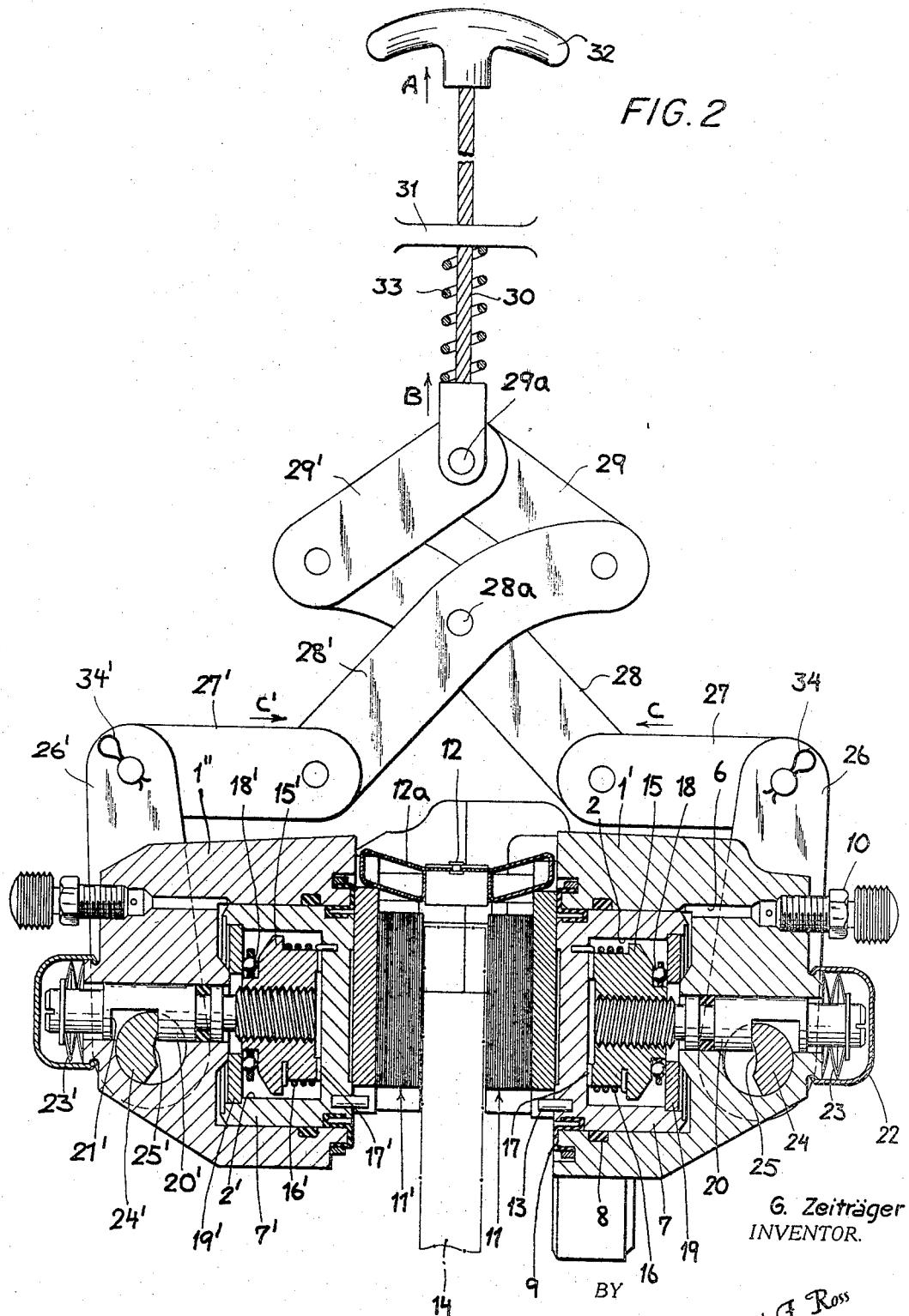
FIG. 2 is a sectional view taken along line II—II of FIG. 1.

In FIGS. 1 and 2 a brake yoke 1 is fixed on an axle housing of a vehicle wheel (not shown). Two wheel-brake cylinders 2, 2' are supplied through inlets 3 (one shown in FIG. 1) with hydraulic fluid from a master cylinder 4 actuated by a brake pedal 5 linked thereto. Air can be bled out of the system through passages 6 normally blocked by screws 10.

FIG. 2 shows the brake yoke 1 with its two halves 1', 1" in which two cup-shaped pistons 7, 7' are axially movable in cylinders 2, 2' whose interior are sealed against the pistons 7, 7' by packing washers 8 and cuffs 9. Brakeshoes 11, 11', consisting of the usual backing plates and brake linings, are held onto pistons 7, 7' by a clip 12 engaged by pins 12a (see FIG. 1) and are locked against rotation by pins 13. When the brake pedal 5 is depressed, hydraulic fluid pumped from the master cylinder 4 (FIG. 1) forces the two pistons 7, 7' toward each other, thus bringing the brakeshoes 11, 11' to bear on a wheel disk 14 between them; the median plane of yoke 1, separating its halves 1', 1", is transverse to the axis of disk 14 whose body lies in that plane.

Nuts 15, 15' inside the pistons 7, 7' are enveloped by torsion springs 16, 16' each having one end attached to the associated piston and the other end anchored to the respective nut so as to tend to rotate same unidirectionally inside its piston 7, 7', such rotation being normally prevented by sawtooth formations 17, 17' on the forward faces of the nuts 15, 15' coacting with the complementarily shaped inner piston surfaces. The opposite, rear faces of the nuts 15, 15' ride on ball bearings 18, 18' which in turn roll upon rings 19, 19' press-fitted into the open backs of the pistons 7, 7'. The rings 19, 19' will be seen to close the interior of the hollow pistons 7, 7' against the fluid spaces of their cylinders 2, 2'.

The nuts 15, 15' have steep female threads mating with similarly threaded bolts 20, 20' which pass through the rings 19, 19'. Unthreaded shank portions of the bolts 20, 20' are provided with lateral notches 21, 21'. The rear extremities of the bolts 20, 20' opposite their threaded ends, projecting from the yoke 1, are protected by removable caps 22 and are under pressure from stacks of Belleville washers 23, 23' inserted between the yoke 1 and the slitted heads of the bolts 20, 20'.

Rotatable shafts 24, 24' skew to the bolts 20, 20', journaled in the yoke halves 1', 1", are partly cut away to form eccentric cam portions with faces 25, 25' contacting the front edges of the notches 21, 21'. Projecting ends of these shafts 24, 24' carry respective levers 26, 26' articulatedly connected, via spring clips 34, 34' and links 27, 27', to two levers 28, 28' which pivot on a fixed fulcrum 28a to form a pair of tongs. The curved top ends of these levers are articulated to two arms 29, 29' whose other ends are jointly hinged at 29a to a cable 30 connected at its opposite end to a driver-operated brake handle 32; when the handle is pulled in the direction of arrow A, cable 30 is tensioned against the force of a compression spring 33, braced between the cable 30 and a fixed stop 31, to draw the pivot 29a upwardly (arrow B). Thus, the two levers 26, 26' move toward each other as indicated by arrows C, C'. This brings the faces 25, 25' of shafts 24, 24' into camming engagement with the forward edges of the notches 21, 21, thereby axially advancing the bolts 20, 20' along with the nuts 15, 15' which are held by the ratchet teeth 17 against rotation and in turn pressed against the pistons 7, 7', bringing the brakeshoes 11, 11' to bear on the wheel disk 14 to decelerate or arrest the vehicle wheel attached thereto. Arms 29, 29' extend the tongs 28, 28' into a scissor linkage with two differentially movable fulcra 28a, 29a.

If the brakeshoes 11, 11' wear to such an extent that the teeth 17 are disengaged upon the withdrawal of bolts 20, 20' under pressure of the Belleville washers 23, 23', the nuts 15, 15' are rotated by the springs 16, 16' in a sense causing them to move forwardly by a fraction of the pitch of their threads, thereby reducing the gap between the pistons 7, 7' and the brake disk 14. For relining, the bolts may be retracted by disengaging the levers 26, 26' from arms 27, 27' through withdrawal of spring clips 34, 34' whereupon the shafts 24, 24' can be swung outwardly through about 90° to let the camming faces 25, 25' clear the bolts 20, 20' for rotation by a screwdriver after removal of caps 22, 22'.

FIG. 3 shows a second embodiment of my invention wherein shafts 124, 124' extend through a yoke 101 on opposite sides of bolts 120, 120' normally concealed by caps 122, 122'. Therefore, levers 126, 126' mounted on shafts 124, 124' swing in the same direction (i.e. counter-clockwise) to drive their brakeshoes, not shown, toward each other. Such swing is brought about by a T-lever 35 having two opposite arms 128, 128' linked to levers 126, 126' by pins 36, 36' playing in slots 37, 37' of these levers, a third arm 129 being anchored to a cable 130 which is under stress from a spring 133 bearing upon an abutment 131 on yoke 101. As in the preceding embodiment, unidirectional motion (arrow D) is converted into concurrent rotation (arrows E, E') of a pair of levers toward each other; the common pivot 128a of arms 128, 128' is located, as before, in the plane of brake disk 114.

I claim:
1. In an automotive brake system, in combination:
a brake rotatable about an axis;
a yoke fixed with reference to said axis and divided into two parts by the plane of said brake disk;
a pair of brakeshoes slidably mounted in said parts for axial displacement toward opposite sides of said brake disk;
a pair of levers swingably carried by said yoke on opposite sides of said plane;
mechanism for translating a swing of each of said levers in a predetermined direction into a displacement of a respective brakeshoe toward said disk;
biasing means bearing upon said levers for resisting such displacement;
operating means including a common actuating element for the displacement of said levers;
and link means connecting said actuating element with said levers, said link means including a pair of arms provided with a common first pivot in said plane, a pair of tongs articulated to said arms and provided with a common second pivot differentially movable with reference to said first pivot, and a motion-transmitting connection between each of said tongs and a respective one of said levers.

2. The combination defined in claim 1 wherein said mechanism includes a pair of coaxial bolts slidable in said cylinders and a pair of shafts skew to said bolts journaled in said yoke, said shafts being rigid with said levers and being provided with camming formations coacting with portions of said bolts, said mechanism further including a pair of nuts threadedly engaging said bolts and positioned to bear upon said brakeshoes, spring means tending to rotate said nuts in a sense advancing same toward said brakeshoes, and detent means for enabling such rotation only upon a retraction of said nuts from said brakeshoes by a predetermined minimum distance.

3. In a vehicular brake system including a rotatable disk, a yoke straddling said disk and forming a pair of brake cylinders, a pair of hollow pistons slidably held in said brake cylinders, a pair of brakeshoes respectively carried by said pistons on opposite sides of said disk, and mechanism for simultaneously advancing said brakeshoes toward said disk, the combination therewith of wear-compensation means comprising a pair of bolts with threaded front portions proximal to said disk received within said pistons; a pair of nuts threadedly engaging said front portions and positioned for contact with confronting inner faces of the respective pistons; spring means tending to rotate said nuts in a sense advancing same toward said disk; and detent means for enabling such rotation only upon a retraction of said nuts from said inner faces by a predetermined distance; said bolts having rear extremities projecting from said yoke for engagement by a resetting tool, said mechanism including a source of pressure fluid communicating with said cylinders and further including a pair of actuating members engageable with said bolts and biasing means bearing upon said cylinders and upon said rear extremities for resisting displacement of said bolts by said actuating members toward said disk.

4. The combination defined in claim 3 wherein said actuating members are a pair of shafts extending skew to said bolts and having eccentric camming formations, said bolts being provided with cutouts normally receiving said formations, said shafts being rotatable into off-normal positions in which said formations clear said cutouts to enable rotation of said bolts by said resetting tool.

5. The combination defined in claim 3 wherein said pistons are provided with rings rearwardly of said nuts, further comprising antifriction bearing means rotatably supporting said nuts on said rings.

6. The combination defined in claim 3 wherein said detent means comprises complementary sawtooth formations on said nuts and said inner faces.

7. The combination defined in claim 3 wherein said biasing means comprises stacks of Belleville washers.

8. The combination defined in claim 3 wherein said actuating members are a pair of shafts extending skew to said bolts and having eccentric camming formations, said bolts being provided with cutouts normally receiving said formations, said shafts being rotatable into off-normal positions in which said formations clear said cutouts to enable rotation of said bolts by said resetting tool.

9. The combination defined in claim 8, further comprising a pair of removable caps normally enclosing said biasing means and said rear extremities.

10. The combination defined in claim 8 wherein said mechanism further includes a pair of levers respectively secured to said shafts, a common actuating element for said levers and link means joining said actuating element with said levers.

References Cited

UNITED STATES PATENTS

| 3,033,325 | 5/1962 | Tjernstrom | 188—73 X |
| 3,109,517 | 11/1963 | Butler et al. | 188—73 |
| 3,285,372 | 11/1966 | Rossmann | 188—73 |
| 3,321,050 | 5/1967 | Press. | |
| 3,372,775 | 3/1968 | Beller et al. | |
| 3,384,204 | 5/1968 | Swift. | |

OTHER REFERENCES

| 1,094,752 | 12/1967 | Great Britain. |
| 1,103,866 | 2/1968 | Great Britain. |

GEORGE E. A. HALVOSA, Primary Examiner

U.S. Cl. X.R.

74—521; 188—106, 196